July 29, 1958      P. THOMSON      2,845,444
APPARATUS AND METHOD FOR STEAM DEODORIZING OF FATS AND OILS
Filed Aug. 18, 1953      2 Sheets-Sheet 1
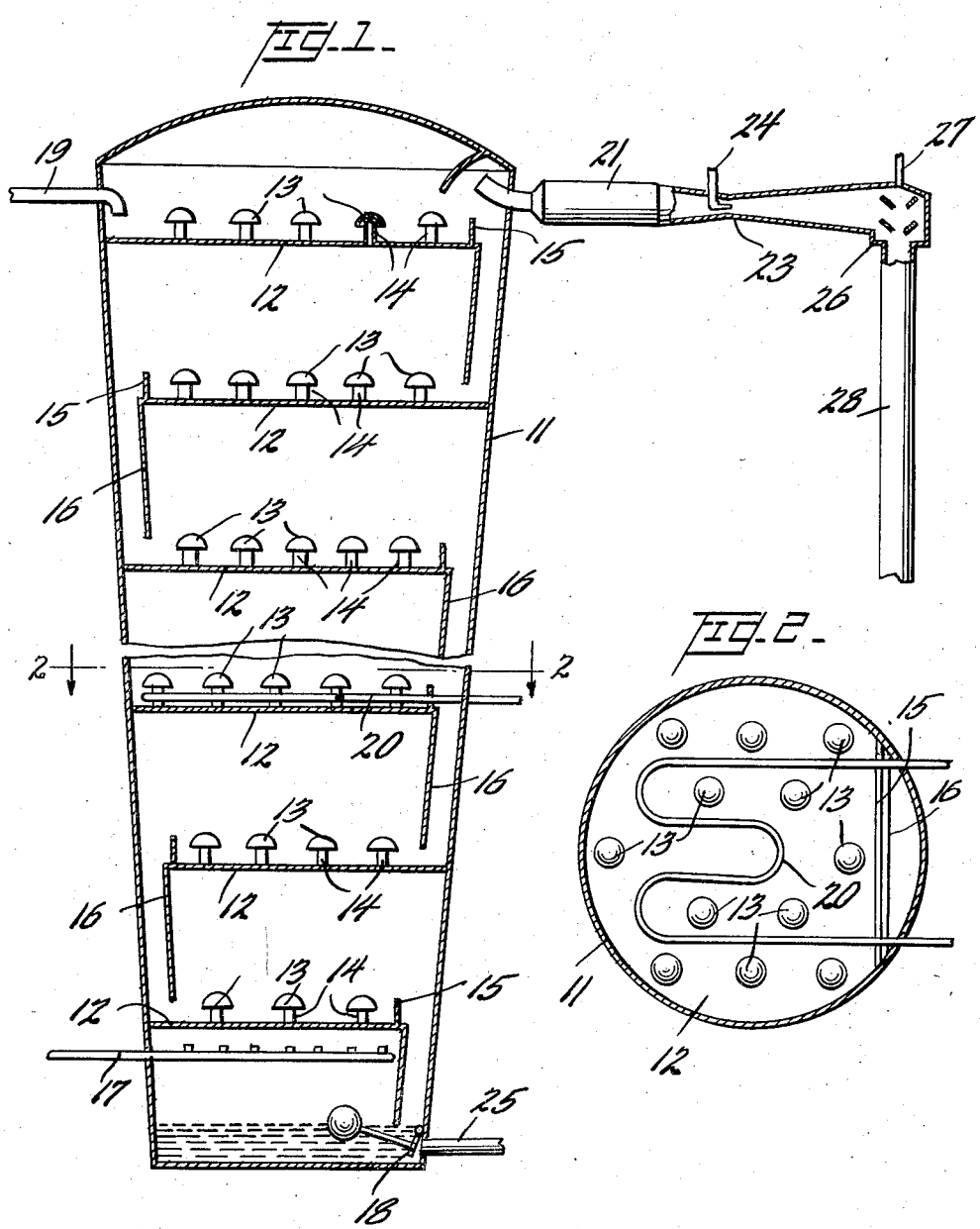
INVENTOR
Procter Thomson,
BY Watson, Cole, Grindle & Watson
ATTORNEYS

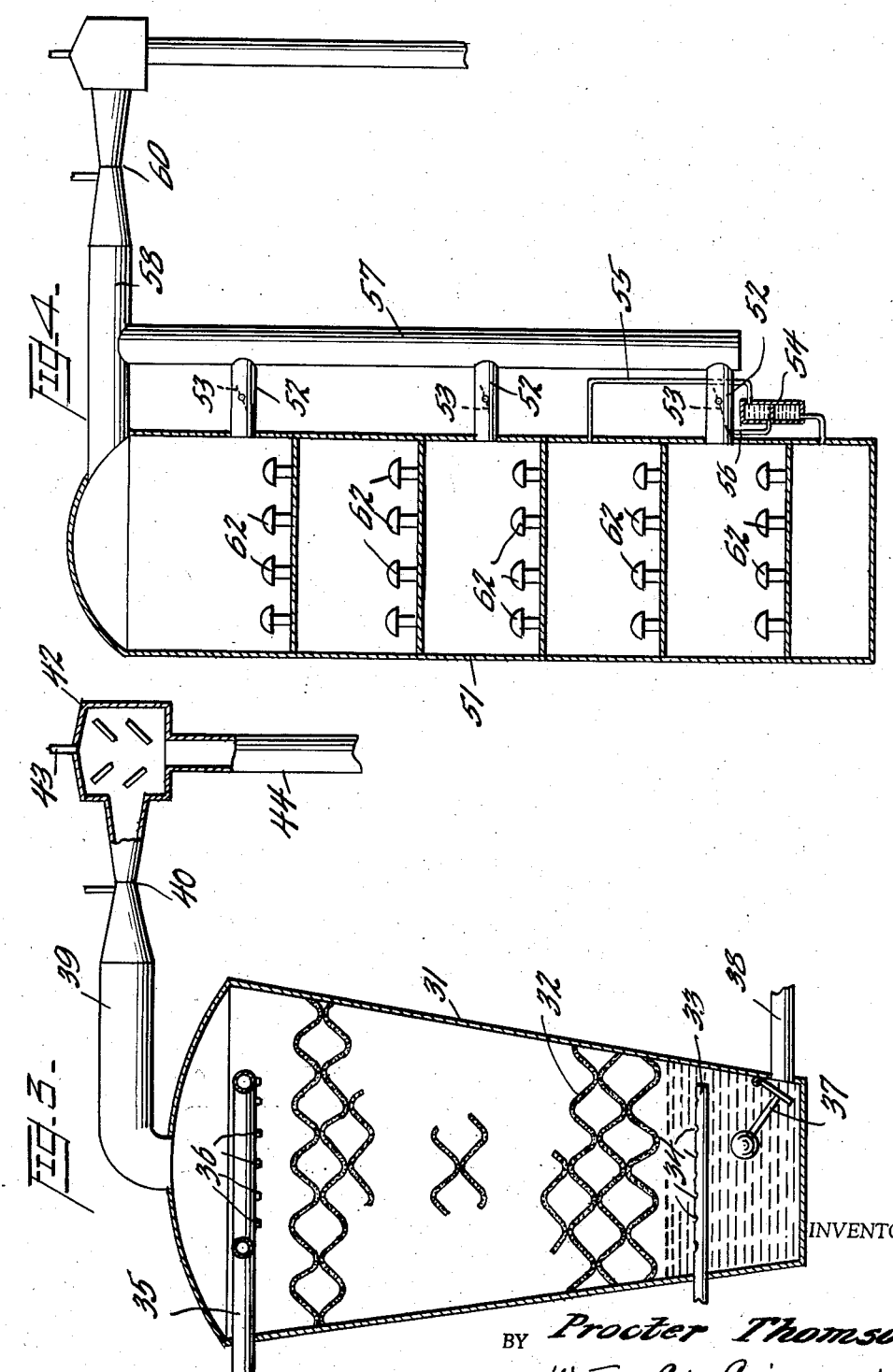

United States Patent Office 2,845,444
Patented July 29, 1958

2,845,444

APPARATUS AND METHOD FOR STEAM DEODORIZING OF FATS AND OILS

Procter Thomson, Cincinnati, Ohio, assignor to The Procter & Gamble Company, Ivorydale, Cincinnati, Ohio, a corporation of Ohio Application August 18, 1953, Serial No. 375,029

3 Claims. (Cl. 260—428)

This invention relates to the deodorization of fats and oils derived either from vegetable or animal sources, and more particularly glyceride fats and oils, such as cottonseed oil, soybean oil and lard. These materials may be deodorized after expression from the original material, as lard for instance, or they may be first refined and bleached or refined, bleached and hydrogenated. They primary object of the invention is the provision of an efficient apparatus and process for the continuous countercurrent stripping of undesirable flavor and odor bearing constituents from fats and oils by means of a current of inert gas such as superheated steam, and the elimination of certain undesirable effects of prior practice in this field.

In the usual process of continuous stripping of volatiles from a fluid, a generally upright tower or column of constant cross-section, equipped with vapor-liquid contact means such as perforated plates, either flat or corrugated, bubble caps, packing or the like, is commonly employed. The fluid to be treated is introduced at the top of the column and the stripping steam at the bottom of the column. A vacuum is applied to the top of the column to withdraw the stripping steam, which is in countercurrent contact with the downwardly flowing fluid, and to discharge with the steam any volatilized material.

In continuous deodorizing, the oil is normally deaerated before it is heated to the deodorizing temperature. The heating may be carried out in the column or in a heat exchanging device before entering the column. Heat losses in the column may be made up by heating coils located on the plates or elsewhere.

In such processes the highest vacuum is at the top of the column, and the pressure drop through the vapor and liquid contacting means disposed in the column causes the volume of a unit weight of the steam at the bottom of the column to be less than at the top of the column. Now, deodorizing is a process that requires a great deal of agitation of the fluid by the stripping steam so that the molecules of undesirable vaporizable material can be torn from the liquid surfaces and carried out by the stripping steam. The desired large volume of steam for stripping oil at the bottom of the column cannot be admitted to the bottom of conventional columns of constant cross-section, because the increase in volume as the steam travels upward results in a greater-than-optimum velocity at the top and produces two undesirable effects, (1) flooding, and (2) excessive entrainment. Various methods of overcoming these difficulties have been proposed. The most common of these methods is to abandon the countercurrent flow of fluid and stripping steam and use fresh steam in each stage of a multiple stage deodorizer. Such apparatus is described in British Patent 277,085, and in the article, "The Semi-continuous Deodorization of Fats," published in The Journal of the Oil Chemists' Society, April 1949, pages 166 to 170, inclusive. Another proposal involves the admission of both steam and oil to the bottom stage of a bubble cap column or its equivalent, the oil moving upward from plate to plate concurrently with the flow of steam. This is described in Dean et al., U. S. Patent No. 2,615,833. This exposes the oil in the upper stage to the maximum volume of steam, but at this point the steam is fouled by volatiles entrained on its way up through the column.

The present invention retains the advantages of countercurrent flow and overcomes the disadvantages of these and other prior processes by maintaining approximate constancy of agitation through arrangements which maintain the ratio of steam volume to area of contacting elements at an approximately constant value throughout the column. Thus it will be appreciated that the increase in volume per unit weight of steam upwardly of the column, resulting from decrease in pressure, is quite high and produces in conventional equipment a correspondingly high velocity of steam in the upper part of the column, with the adverse effects hereinbefore mentioned. It is proposed, in accordance with the instant invention, to avoid excessive increase in steam velocity either by progressive upward increase in capacity of the column or by progressive upward decrease of the amount by weight of steam.

In the preferred form of the invention, the desired result may be accomplished by providing an increase in the cross-sectional area of the column as the steam travels upward through the column, so that the means for contacting the fat or oil to be deodorized with the inert stripping vapor increase in area in proportion to volume and entraining effect of the vapor. If a series of circles of uniformly increasing area are stacked a uniform distance apart one above the other on a common axis, their edges will not fall along a straight line but along a parabola. A 20-foot column defined by such a series of circles, having a diameter at the base of 2 feet and at the top of 4 feet, would have an area at the bottom of $$4 \times \frac{\pi}{4}$$

and at the top of $$16 \times \frac{\pi}{4}$$

and the area at the 10 foot level, halfway up the column, to be halfway in area would be $$\frac{(4+16)}{2} \times \frac{\pi}{4}$$

or $$10 \times \frac{\pi}{4}$$

The diameter at this level would be $$\sqrt{10} = 3.16 \text{ feet}$$

If the column were made as a truncated cone, 2 feet in diameter at the bottom and 4 feet at the top, the diameter at the midpoint would be 3.0 feet. The difficulties in fabricating such a parabolic column are considerable, and the differences in area between such a column and one formed as a truncated cone are small. It is usually desirable, therefore, to accept such slight departure from the theoretical formula, $$\frac{\text{Steam volume}}{\text{Area of contacting elements}} = \text{constant}$$

as is involved in the substitution for the parabolic column of a structure with straight line elements in the sides, that is a truncated cone, or a series of truncated cones.

In a modification of the invention, my primary object is accomplished by withdrawing steam at selected levels from a column of substantially uniform cross-section, thus keeping the ratio of steam volume to area of contacting elements at approximately a constant value throughout the column. In each of these methods the advantages of countercurrent flow of steam and oil may be retained, and the oil in the finishing section of the column subjected to the optimum agitation and scavenging effect of fresh steam, without flooding or excessive entrainment in any portion of the apparatus.

The invention will now be explained in terms of certain preferred embodiments thereof, illustrated in the accompanying drawings forming a part hereof, it being understood that no limitation of the scope of the invention is thereby intended. In the drawings, which are schematic in character:

Figure 1 is a vertical sectional view of an apparatus embodying my invention;

Figure 2 is a transverse sectional view on the line 2—2 of Figure 1;

Figure 3 is a vertical sectional view of a packed column employing the principles of the invention; and Figure 4 is a vertical section of a further modification.

Referring to Figures 1 and 2, the reference numeral 11 designates a deodorizing tower or column of the truncated cone type. Supported within the column, and vertically spaced at uniform intervals therein are transverse plates 12 provided with conventional bubble caps 13 having risers 14. Weirs 15 are associated with each plate 12 to control the level of fluid thereon. Downcomers 16 carry the fluid from one plate to the next lower plate in such a manner as to cause the fluid to flow across the plates in alternate directions, right to left on one plate and left to right on the one below. Stripping steam, which may be superheated, is admitted at the lower end of the column through steam inlet pipe 17 and the oil to be treated enters at the top of the column through oil inlet pipe 19. One or more heating coils 20, the number of which may be varied with the size of the column and accompanying heat losses, are suitably located within the column. A steam and vapor outlet 21 is connected to the ejector 23, which is supplied with steam through pipe 24. The stripped oil leaves through an outlet 25 which leads to a heat exchanger, not shown, wherein the heat of the deodorized oil may be employed to raise the temperature of the entering oil either before or after deaeration.

The deaerated oil to be stripped enters the column at 19 and flows across the top plate over the weir 15, down the downcomer 16 and across the next plate and so on. The stripping steam enters at 17 and passes upward through the riser 14 and is distributed through the oil by the caps 13 which may be slotted or serrated to improve distribution of the steam. The steam and the vapors picked up from the oil leave the column through the outlet 21, flow being promoted by the ejector 23, which is supplied with steam through pipe 24. The uncondensed vapors are then passed to further vacuum producing means, such as ejectors, condensers and the like, for example a spray head 26, supplied with water at 27, the water and condensate discharging through the seal column 28.

The oil flowing down the column 11 is collected in the lower part thereof, where the level of oil is controlled by a float valve 18, the oil being drawn out by a pump not shown.

Figure 3 shows a packed column fitted with packing similar to that described in U. S. Patent No. 2,470,652 (Scofield), although any suitable packing may be employed. A tapering column 31 similar to that shown in Figure 1 may be used, the packing being represented at 32. The column is supplied with a stripping steam inlet 33, steam outlet orifices 34, and an oil inlet 35 fitted with distributing orifices 36. A level control device is shown at 37. From the oil outlet 38, the oil may flow to a cooling oil, not shown, or to a heat exchanger for heating the inlet oil. Steam and impurities stripped from the oil are discharged at 39, with the aid of a steam ejector 40, into spray head 42, the latter being provided with water inlet 43, and discharging into water seal 44.

The required taper of the packed column will depend upon the pressure drop through the packing and, in general, will be less than the taper in a bubble cap column.

It will be appreciated that the area of the liquid and vapor contacting means is increased upwardly as the pressure on the vapor decreases, so that entrainment and flooding are prevented in the upper part of the column even when large amounts of steam are introduced into the bottom of the column. This is achieved in a bubble cap column, for example, by so enlarging the diameter of the column upwardly that the cross-sectional area of the column and the total area of the risers through which the vapors pass increase in direct proportion to the increase in volume of the stripping steam as it rises in the column.

In the practice of the invention, using a bubble cap column tapering upwardly but otherwise designed according to principles well known in the art, the number of bubble caps will increase in proportion to the progressive upward increase of area of the column. There will ordinarily be slight deviations from this number, because fractional bubble caps are not practical and because the pattern of flow may make it undesirable to add exactly the number of bubble caps required by the increase in area upwardly of the column. Except for these limitations, the area of vapor-liquid contact means, whether measured by the number of bubble caps, the perimeter of the caps or any other measure of contact means, is ordinarily proportional to the area of a plate, which is, of course, the area of the column at the level of the plate. For this reason, the area of the column in a given plane may be used in calculating vapor flow at that plane.

The following specific examples are illustrative of various methods of calculating the dimensions of a tapered column, it being understood that no limitation of the invention is thereby intended.

*Example 1a.*—In a 20 plate column with one inch of oil loss of pressure through each plate, the total pressure drop through the 20 plates will be 20 inches of oil, which, at a specific gravity of 0.9 for oil, will be equal to 18 inches of water or 1.33 inches of mercury. If the column is equipped with vacuum producing equipment fitted with a single stage ejector, the pressure at the top of the column may be 1.75 inches of mercury absolute. The pressure at the bottom of the column will then be the top pressure plus the pressure drop through the column or 3.08 inches of mercury. If a bottom diameter is taken of 2 feet or an area of 3.1416 square feet, the preferred top area can be calculated as $$3.1416 \times \frac{3.08}{1.75} = 5.53 \text{ square feet}$$

The top diameter will then be 2.65 feet.

*Example 2a.*—In a similar column, 2 feet in diameter at the bottom, having a pressure drop of 1.33 inches, equipped with a more efficient vacuum producing means, for instance, one that will produce an absolute pressure of 0.4 of an inch of mercury at the top, the required increase in diameter upwardly becomes much greater. The pressure at the bottom will be as before, top pressure plus drop in pressure through the column or 0.4+1.33=1.73 inches of mercury. Then the preferred top area will be $$3.1416 \times \frac{1.73}{0.4} \text{ or } 13.58 \text{ square feet}$$

and the preferred top diameter will be 4.15 feet.

In the above examples, no account has been taken of the volume of the material stripped out of the oil, but it can be shown that this factor may normally be disregarded in designing the equipment. Thus, assuming a steam consumption of 2% per hour, then for 25,000 lbs. of fat per hour the steam used will be 500 lbs. per hour. If it is assumed that 1% by weight, or 250 lbs. based on total fat fed, of material with a molecular weight of 300 is stripped out, the volume of such material at standard pressure and temperature will be 300 cubic feet. 500 lbs. of steam will have a volume of 10,000 cubic feet at STP, so that roughly 3% of the vapor volume is derived from the material distilled out. This is too little to require a correction.

Another method can be used to calculate the desired increase in diameter of the column. This method considers the mass of the stripping steam as well as its velocity and assumes that the entraining and agitating effects are proportional to the kinetic energy, where M is the mass of a unit volume of stripping steam and V is the linear velocity of the steam. Using this method, the kinetic energy per cubic foot of steam is maintained substantially constant as the steam moves up through the column. Calling the kinetic energy K the formula can be written:

$$K = \frac{1}{2} MV^2$$

or $$V = \sqrt{\frac{K'}{M}}$$

A formula for calculating vapor velocities which includes this concept as well as other considerations is given in Perry's Chemical Engineers Handbook, 2d edition, page 1449, and is applicable here. In this formula:

$V$ = vapor velocity ft./sec. based on total column area.
$P_1$ = density of liquid downflow under column conditions.
$P_2$ = density of vapor under column conditions.
$K_2$ = A constant as defined by conditions, material and tray design (a value for $K_2$ of 0.1 is suitable).

Then, $$V = K_2 \sqrt{\frac{P_1 - P_2}{P_2}}$$

*Example 1b.*—Taking the conditions described in Example 1a, namely, a pressure at the top of the column of 1.75 inches of mercury absolute, and at the bottom of the column of 3.08 inches, and assuming a constant temperature of 400° F. throughout the column, the following values may be derived.

For the bottom of the column:

$P_1$ becomes 56.1 lbs. per cubic foot.
$P_2$ becomes .00294 lb. per cubic foot.
$V$ = 14 linear ft./sec.
Lbs./sq. ft./sec. = 14 × .00294 = .041.

For the top of the tower:

$$V = K_2 \sqrt{\frac{P_1 - P_2}{P_2}} \quad P_2 = .00168$$

$$V = .1 \sqrt{\frac{56.1 - .00168}{.00168}} = 18.2 \text{ ft./sec.}$$

Lbs./sq. ft./sec. = 18.2 × .00168 = .0306

Taking a 2 foot diameter at the bottom of the column, as before,

The area at top of column = $3.1416 \times \frac{.041}{.0306} = 4.2$ sq. ft.

Diameter at top = 2.27 feet.

*Example 2b.*—Taking the column with 0.4 inch minimum absolute pressure at the top, 1.73 at the bottom and applying the kinetic energy concept:

For the bottom velocity $$V = K_2 \sqrt{\frac{P_1 - P_2}{P_2}}$$

$P_1$ = 56.1
$P_2$ = .00167

$$V = .1 \sqrt{\frac{56.1 - .00167}{.00167}} = 17.3 \text{ ft./sec.}$$

Lbs. per sq. ft. sec. = 17.3 × .00167 = .0288

For the top velocity $P_1$ = 56.1
$P_2$ = .00385

$$V = .1 \sqrt{\frac{56.1 - .000385}{.000385}} = 37.4 \text{ ft. sec.}$$

Lbs. per sq. ft. per sec. = 37.4 × .000385 = .0144

As before,

Top area = $3.1416 \times \frac{.0288}{.0144} = 6.28$

Top diameter = 2.72 ft.

These values may be summarized as follows:

| | Examples 1a, and 1b | Examples 2a and 2b |
|---|---|---|
| Top pressure absolute ......... inches mercury | 1.75 | .4 |
| Bottom ......... do | 3.03 | 1.73 |
| Bottom diameter ......... feet | 2.0 | 2.0 |
| Top diameter: | | |
| (a) Velocity formula ......... do | 2.65 | 4.15 |
| (b) $MV^2$ formula ......... do | 2.27 | 2.72 |

In applying my invention to the design of a column tapering outwardly upward, the increase in area is desirably not substantially less than that determined by the kinetic energy formula because this would lead to flooding and entrainment in the upper part of the column.

Likewise the increase in area is not desirably much greater than that required by the constant velocity formula because if this increase is exceeded, the velocity of the stripping steam will fall to where its stripping effect is reduced below the maximum effectiveness. Since an intermediate value is desirable, the area may be that determined by the kinetic energy formula plus about 25% of the difference between the values calculated from the two formulae.

It will be appreciated, therefore, that while it is generally the object of the invention to maintain substantially constant, throughout the column, the ratio of vapor volume to area of transverse section of the column, this ratio may vary substantially within the limits of constant velocity and constant kinetic energy (as hereinbefore defined) of the stripping steam.

The objects of my invention cannot be achieved merely by providing only a few bubble caps in the bottom section of a cylindrical column and a gradually increasing number at higher levels. It is desirable that an efficient arrangement of bubble caps, their spacing and design, be selected following principles known to those skilled in the art and that this construction be nearly duplicated on all plates except for small variations due to the changing areas and the necessity for choosing a good pattern for the bubble caps. It is, of course, not necessary that the outer shell of the column be tapered outward, since the desired effect can be achieved by inserting liquid and gas tight tapering linings on the inside of a cylindrical column.

Similarly, in a packed column the pattern of the packing is preferably essentially the same throughout the column, more packing being used as the diameter of the column increases upwardly.

While the use of a column of increasing cross-sectional area upward is preferred, the uniform agitation that is its purpose may be obtained by other means. Thus, in a column of uniform diameter, the large amount of steam required for good stripping may be introduced into the lower part of the column and entrainment and flooding in the upper part of the column avoided by withdrawing steam at intermediate levels. In the use of this method, absolute uniformity may be achieved by withdrawing steam and vapor at close intervals, for instance from under each plate in a bubble cap column. In practice, however, it will usually be found satisfactory to provide withdrawal outlets at more widely spaced intervals, for instance, the outlets may be placed at intervals of from 2 to 4 or even 5 plates. The depth of liquid over the outlets in the bubble caps affects the pressure drop and this depth largely determines the pressure drop through a plate. If the pressure drop is large per plate, the withdrawal outlets will be spaced more closely; if the pressure drop per plate is small, a greater number of plates can be served with a single outlet.

Referring now to Figure 4, in which this aspect of the invention is illustrated, a deodorizing column 51 of substantially uniform cross-section is provided with vapor and liquid contacting means comprising bubble caps 62. A withdrawal manifold 57 is connected with vapor pipe 58, which discharges the main body of stripping steam and vapors from the top of the tower; steam ejector 60 maintains a vacuum within the column and increases the velocity of the discharging vapors. Further vacuum producing means, such as condensers, ejectors and the like (not shown), may be employed. The column is provided with a plurality of vertically spaced withdrawal outlets 52 fitted with valves 53, and each valve may be automatically regulated by means shown schematically at 56 and comprising an air operated valve positioned actuated by a low pressure differential controller 54, such as Foxboro type 29 Bell meter body, controlled by pressure lines 55 communicating with the column at points between which the pressure drop is to be controlled.

Assuming that a column of the type shown in Figure 4 is provided with 20 plates and has 1.75 inches mercury pressure at the top and 3.08 inches at the bottom, and that steam is to be withdrawn at three points, under the 5th, the 10th and 15th plates, it will be observed that each withdrawal zone consists of 5 plates so the drop in pressure is ¼ of the total drop, or approximately .33 inch. The amount of withdrawal, therefore, may be estimated on the equal velocity basis as follows:

If 100 cubic feet of steam at 3.08 inches of mercury absolute be introduced at the bottom of the column, the pressure at the first withdrawal point above the bottom will be 3.08 inches —.33 inch or 2.75 inches of mercury absolute. The steam volume at the first withdrawal point will be then $$\frac{3.08}{2.75} \times 100 \text{ or } 112 \text{ cubic feet}$$

and the withdrawal will be 12 cubic feet. The remaining 100 cubic feet will then expand to the volume of $$100 \times \frac{2.75}{2.75 - .33} \text{ or } 113 \text{ cubic feet}$$

so that the withdrawal will be 13 cubic feet at the second withdrawal.

The 100 cubic feet remaining will then expand to $$\frac{2.42}{2.42 - .33} \times 100 = 116 \text{ cubic feet}$$

Thus the withdrawal will be 16 cubic meet at the third withdrawal point.

The withdrawing mechanism will then be so designed as to withdraw a total of about 14% of the volume at each of the three withdrawal points, compensation for small deviations being effected by adjustment of the control mechanism itself.

The amount of steam to be withdrawn on a constant kinetic energy basis can be calculated simply from the values derived for tapered columns as hereinbefore described. Thus the increase in area for constant velocity was 5.53—3.14 sq. ft.=2.39 sq. ft.

The increase in area for the constant kinetic energy is 4.20—3.14=1.06. Hence the amounts of steam to be withdrawn on the kinetic energy basis are $$\frac{1.06}{2.39}$$

or 44.5% of the amount drawn out on the constant volume basis. Then design will be based on 44.5% of 14%, or a total of 6% of the volume will be withdrawn at each of the three withdrawal points, small variations from this amount being taken care of by adjusting the control mechanism.

These adjustments may be made by inserting Pitot tubes in the withdrawal pipes 52, the tubes being small to avoid changing the flow. In practice, it is usually satisfactory to effect such adjustment that flooding is avoided.

Having thus described my invention, what I claim and desire to secure by Letters Patent is:

1. In a continuous process of deodorizing glyceride oils and fats, the steps which comprise continuously introducing oil to be deodorized into the upper part of a generally upright stripping column having liquid and vapor contact means therein, passing stripping steam into the lower part of said column, maintaining said column under vacuum by withdrawing vapors from the upper part thereof, whereby the absolute pressure within the column decreases substantially from the lower part to the upper part of said column, withdrawing deodorized oil from the lower part of said column, and withdrawing from said column at each of a plurality of vertically spaced points a quantity of steam not less than that required to ensure substantially equal kinetic energy per cubic foot of stripping steam and not more than that required to ensure substantially equal velocity of stripping steam throughout the column.

2. Apparatus for use in the continuous countercurrent steam deodorizing of glyceride oils and fats comprising, in combination, a generally upright stripping column, liquid and vapor contact means supported in said column, said column having an oil inlet and a vapor outlet in the upper part thereof, and an oil outlet and a steam inlet in the lower part thereof, vacuum creating means communicating with said vapor outlet to effect withdrawal of steam and volatilized material from said column, whereby the absolute pressure within the column decreases substantially from the lower part of the column to the upper part of the column, vapor outlets communicating with said column at vertically spaced points intermediate the said upper and lower parts of said column, and means withdrawing from said last named outlets a quantity of vapor not less than that required to ensure substantially equal kinetic energy per cubic foot of stripping steam throughout the column and not more than that required to ensure substantially equal velocity of stripping steam throughout the column.

3. Apparatus for use in the continuous countercurrent steam deodorizing of glyceride oils and fats comprising, in combination, a generally upright stripping column, liquid and vapor contact means supported in said column, said column having an oil inlet and a vapor outlet in the upper part thereof, and an oil outlet and a steam inlet in the lower part thereof, vacuum creating means communicating with said vapor outlet to effect withdrawal of steam and volatilized material from said column, whereby the absolute pressure within the column decreases substantially from the lower part of the column to the upper part of the column, and means for withdrawing from said column below the upper part thereof an amount of steam sufficient to effect material reduction of steam velocity in the upper part of said column.

References Cited in the file of this patent

UNITED STATES PATENTS

| | | |
|---|---|---|
| 253,802 | Wise | Feb. 14, 1882 |
| 1,243,776 | Stone | Oct. 23, 1917 |
| 1,403,723 | Recklinghausen | Jan. 17, 1922 |
| 1,748,855 | Teter | Feb. 25, 1930 |
| 1,869,757 | Kuhni | Aug. 2, 1932 |
| 1,900,085 | Wallis | Mar. 7, 1933 |
| 1,942,446 | Peterkin | Jan. 9, 1934 |
| 2,224,986 | Potts et al. | Dec. 17, 1940 |
| 2,326,243 | Meyer | Aug. 10, 1943 |
| 2,433,060 | Ohsol et al. | Dec. 23, 1947 |
| 2,461,694 | McCubbin et al. | Feb. 15, 1949 |
| 2,615,833 | Dean et al. | Oct. 28, 1952 |
| 2,621,196 | Thurman | Dec. 9, 1952 |
| 2,621,197 | Thurman | Dec. 9, 1952 |

FOREIGN PATENTS

| | | |
|---|---|---|
| 304,129 | Germany | Dec. 7, 1916 |

UNITED STATES PATENT OFFICE
CERTIFICATE OF CORRECTION

Patent No. 2,845,444                                               July 29, 1958

Procter Thomson

It is hereby certified that error appears in the printed specification of the above numbered patent requiring correction and that the said Letters Patent should read as corrected below.

Column 3, line 73, for "oil" read -- coil --; column 7, line 34, for "positioned" read -- positioner --.

Signed and sealed this 21st day of October 1958.

(SEAL)
Attest:

KARL H. AXLINE
Attesting Officer

ROBERT C. WATSON
Commissioner of Patents